United States Patent
Maclean et al.

(10) Patent No.: US 10,637,529 B2
(45) Date of Patent: Apr. 28, 2020

(54) SIGNAL EQUALISATION

(71) Applicant: Raptor Oil Limited, Aberdeen (GB)

(72) Inventors: Colin Maclean, Aberdeen (GB); Gordon Cowie, Aberdeen (GB)

(73) Assignee: Raptor Oil Limited, Aberdeen (GB)

(*) Notice: Subject to any disclaimer, the term of this patent is extended or adjusted under 35 U.S.C. 154(b) by 29 days.

(21) Appl. No.: 15/903,350

(22) Filed: Feb. 23, 2018

(65) Prior Publication Data

US 2018/0183487 A1    Jun. 28, 2018

Related U.S. Application Data

(63) Continuation of application No. 15/342,377, filed on Nov. 3, 2016, now Pat. No. 9,941,924.

(30) Foreign Application Priority Data

Nov. 4, 2015 (GB) .................................. 1519471.5

(51) Int. Cl.
| | |
|---|---|
| H04B 1/69 | (2011.01) |
| H04B 1/707 | (2011.01) |
| H04B 1/713 | (2011.01) |
| H04B 11/00 | (2006.01) |
| H04L 27/10 | (2006.01) |
| G08C 23/02 | (2006.01) |
| H04L 25/03 | (2006.01) |

(52) U.S. Cl.
CPC .............. *H04B 1/69* (2013.01); *G08C 23/02* (2013.01); *H04B 11/00* (2013.01); *H04L 25/03834* (2013.01); *H04L 27/103* (2013.01); *H04B 2001/6912* (2013.01)

(58) Field of Classification Search
CPC .. H04B 1/69; H04B 11/00; H04B 2001/6912; H04B 13/00; H04L 27/103; H04L 25/03834; G08C 23/02
USPC ........................................................ 375/139
See application file for complete search history.

(56) References Cited

U.S. PATENT DOCUMENTS

| | | | |
|---|---|---|---|
| 9,645,228 B1 | 5/2017 | Doerry et al. | |
| 9,941,924 B2* | 4/2018 | Maclean | H04B 11/00 |
| 2004/0105344 A1 | 6/2004 | Davies et al. | |
| 2010/0135117 A1 | 6/2010 | McRory | |
| 2014/0086280 A1 | 3/2014 | Huang | |
| 2014/0369388 A1* | 12/2014 | Parks | H04B 13/00 |
| | | | 375/139 |

(Continued)

FOREIGN PATENT DOCUMENTS

| | | |
|---|---|---|
| GB | 2475039 A | 5/2011 |
| KR | 20100068174 A | 6/2010 |

OTHER PUBLICATIONS

Drumheller, Douglas S.; "Wave Impedances of Drill Strings and Other Periodic Media"; J. Acoust. Soc. Am., vol. 112, Issue 6; Dec. 2002; pp. 2527-2539.

(Continued)

*Primary Examiner* — Phuong Phu
(74) *Attorney, Agent, or Firm* — Winstead PC

(57) ABSTRACT

Generated chirp pulses are modified so that they have an increased time bandwidth product to compensate for noise and/or attenuation in a communication channel. In certain circumstances, the modification alone may be inefficient so a counterbalancing modification may be applied at the receiver.

9 Claims, 19 Drawing Sheets

(56) References Cited

U.S. PATENT DOCUMENTS

2016/0245781 A1* 8/2016 Ahmad .................. G01N 29/02

OTHER PUBLICATIONS

Drumheller, D.S.; "An Overview of Acoustic Telemetry"; Sandia National Laboratories, Albuquerque, New Mexico; SAND-92-0677C; Mar. 1992; 7 pages.

Drumheller, Douglas S.; "Acoustical Properties of Drill Strings"; Sandia Report, SAND88-0502, UC-66c; Sandia National Laboratories, Albuquerque, New Mexico; Jul. 1988; 68 pages.

Shah, Vimal, et al.; "Design Considerations for a New High Data Rate LWD Acoustic Telemetry System"; SPE Asia Pacific Oil and Gas Conference and Exhibition, Perth, Australia; SPE 88636; Oct. 2004; 7 pages.

Berni, Albert, et al.; "On the Utility of Chirp Modulation for Digital Signaling"; IEEE Transactions on Communications; Jun. 1973; pp. 748-751.

Cook, C.E. et al., "A Pulse Compression Predistortion Function for Efficient Sidelobe Reduction in a High-Power Radar" in Proceedings of the IEEE, vol. 52, No. 4, pp. 377-389, Apr. 1964.

* cited by examiner

SIGNAL EQUALISATION

CROSS REFERENCE TO RELATED APPLICATIONS

This application is a continuation application of U.S. patent application Ser. No. 15/342,377, filed on Nov. 3, 2016, which claims the benefit of GB Application No. 1519471.5, filed on Nov. 4, 2015. U.S. patent application Ser. No. 15/342,377 and GB Application No. 1519471.5 are incorporated herein by reference in their entirety for all purposes.

BACKGROUND

Technical Field

The present invention relates generally to the control of noise in communication channels. More specifically, the present invention relates to the control of noise in communication channels that use broadband chirps.

Description of Related Art

Broadband chirp signals have been found useful in various communication scenarios. One particularly challenging scenario relates to acoustic communications "downhole" in the field of drill-based hydrocarbon exploration and extraction.

Downhole conditions are hostile with unstable, difficult communication conditions and high temperatures. The high temperature environment, such as a deep well, restricts hardware computational resources to low speed processors with small amounts of on-board memory. Unstable communication channels (whether electromagnetic, acoustic or wired) or the need to prioritize data processing leads to the requirement for flexibility in managing resources as conditions change.

One of the roots of instability in such communication channels is the present of noise. It is for this reason that chirp pulses are attractive—they are relatively immune to noise. For a given scenario certain frequencies can be expected to be more prone to noise than others. It is therefore desirable that the communication channel used for downhole communications is dynamically selected to correspond to frequencies least exposed to the effects of noise. Where noise is present, it is also desirable that the communication channel does not overcompensate by requiring excessive transmission power levels.

"In well" communication by means of acoustic pulse transmission and reception (i.e. acoustic telemetry) along a drillstring is severely limited by the dynamic and nonstationary nature of the channel both in terms of noise and channel transfer function. One main issue in downhole communications is to ensure that signals sent by a first unit (i.e. transceiver node) in an acoustic telemetry system reach and are detected by a second unit in that system, even when the transmission lies well inside noise (i.e. having an amplitude comparable to noise in the transmission medium). The receiving unit must then be able to remove any noise and recover the signal.

The presence of noise in current acoustic telemetry systems means that relays are required to boost the signal beyond a maximum of 2,500 m in a vertical deployment and 950 m in a horizontal deployment.

It is known to use chirp codes (i.e. linear frequency modulation) in signal propagation. A chirp code offers a high signal to noise ratio and therefore allows transmission through high noise environments. A typical chirp pulse is a frequency sweep pulse with a short autocorrelation function.

Chirp pulses may be any pressure wave signal capable of pulse compression. Chirp pulses have the property that the longer the pulse length (often derived from the time-bandwidth, TB, product) the better the immunity to noise without loss of resolution. The relationship is given by the following equation:

$$S/N = 10 \cdot \log(\mathrm{SQRT}(TB)) \qquad \text{(eq. 1)}$$

This is illustrated in FIG. 6.

The drillstring may be considered as a series of (steel) pipes of uniform length connected by short couplings having different physical properties: this can effectively limit practical communications to a number of "passbands". The issue is discussed in greater detail in an article entitled "Wave impedances of drillstrings and other periodic media", Drumheller. Douglas S, (Journal of the Acoustical Society of America, Volume 112, Issue 6, pp. 2527-2539 (2002)).

Typically passbands having the lowest frequencies are considered to contain unacceptably high levels of noise and are therefore thought not to be viable for the purpose of downhole communications. In the case of chirp pulses, the longer the pulse length the better the immunity to noise. This opens the possibility of using passbands that were previously avoided.

To achieve an increased chirp length (and thus increased immunity to noise without loss of resolution), known systems adopt lower bit-rates. They also rely on using a narrow section of the passbands in order to ensure that any variation in width or position of the band is compensated for. In addition, these known systems rarely use more than one passband, again limiting the performance and flexibility of the device.

In summary, current systems have limited their technical solution in order to gain reliability but have sacrificed performance, flexibility, and (ironically) reliability.

Known techniques do little to address noise immunity and typically require pumping/drilling to stop—low frequency passbands are avoided due to high intrinsic background noise.

SUMMARY

In accordance with a first aspect of the present disclosure, there is provided a method for generating a plurality of chirp pulses for use in a communication channel, the channel being operable over a plurality of frequency bands, the frequency bands including at least one first frequency band having propagation characteristics different from other frequency bands, the method comprising, at a chirp pulse generator: generating an initial chirp pulse having a time bandwidth, TB, product with a first value for frequencies in the or each first frequency band and a TB product with a second value for frequencies in bands other than the or each first frequency band, the second value being lower than the first value.

In certain embodiments, the chirp pulse may be a linear chirp pulse.

In certain embodiments, the chirp pulse may be a hyperbolic chirp pulse.

In certain embodiments, the first frequency band may experience attenuation at a level higher than a further attenuation level in the other frequency bands.

By locally modifying the frequency structure of chirps, it is possible to enhance the gain in the sections of the chirp corresponding to frequencies where attenuation is most prevalent while reducing the power applied over the entire operating range of the chip communications channel. This balance is achieved by implementing local extension in the time bandwidth product (TB product) of the chirp pulse in the attenuated frequency bands.

In certain embodiments, the first frequency band may experience a level of noise higher than the other frequency bands. In these cases, the method may further comprise, at a receiving apparatus, compensating for the difference in first and second values of TB product in the initial chirp pulse by applying a correlator function, thereby equalizing the initial chirp pulse.

In certain embodiments, the method may further comprise sampling a received signal corresponding to a transmitted signal having a known power spectrum at a plurality of frequencies, and correlating the known signal with the received signal to detect frequencies at which the power spectra differ, thereby detecting the presence of band limited noise in the or each first frequency band.

In certain embodiments, the correlator function may be a matched filter function.

In certain embodiments, the communication channel may be an acoustic telemetry channel.

The method thus delivers a pulse design that balances noise immunity with power consumption in an elegant and reliable manner. The method is especially applicable to an acoustic telemetry channel, such as that used for low-data rate communications between downhole equipment and head-end equipment in the field of drill-based hydrocarbon exploration.

By modifying the frequency structure of chirps, it is possible to enhance the noise immunity properties of the chirp for those frequencies where noise is experienced while reducing the power applied over the entire operating range of the chip communications channel. This balance is achieved by implementing local extension in the time bandwidth product (TB product) of the chirp pulse in the noisy frequency bands.

The local extension of the TB product means that the signal in the extended frequency range is "pre-emphasised". The pre-emphasis in turn reduces the effective bandwidth of the resulting waveform and increases that width of the pulse when it is decoded. When counteracting noise, the method then compensates for this pre-emphasis by applying a complementary "de-emphasis" function (i.e. a signal equalisation or "correlator" function).

The method therefore facilitates signal equalization against noise by modifying chirp pulses to reduce the influence of noise at certain frequency ranges, while ensuring that power need not be applied at frequency ranges where noise is comparatively low.

In accordance with a further aspect of aspect of the present disclosure, there is provided an apparatus for generating a plurality of chirp pulses for use in a communication channel, the channel being operable over a plurality of frequency bands, the frequency bands including at least one first frequency band having propagation characteristics different from other frequency bands, the apparatus comprising processing circuitry configured to: generate an initial chirp pulse having a time bandwidth, TB, product with a first value for frequencies in the or each first frequency band and a TB product with a second value for frequencies in bands other than the or each first frequency band, the second value being lower than the first value.

In certain embodiments, the first frequency band may experience attenuation at a level lower than a further attenuation level in the other frequency bands.

In certain embodiments, the first frequency band may experience a level of noise higher than the other frequency bands. The processing circuitry of the apparatus may be further configured to equalize the initial chirp pulse by applying a correlator function.

The apparatus may further comprise a communication unit for transmitting the chirp pulses.

Various further aspects and embodiments of the present disclosure are provided in the accompanying independent and dependent claims.

It will be appreciated that features and aspects of the present disclosure described above in relation to the first and other aspects of the invention are equally applicable to, and may be combined with, embodiments of the invention according to the different aspects of the invention as appropriate, and not just in the specific combinations described above. Furthermore features of the dependent claims may be combined with features of the independent claims in combinations other than those explicitly set out in the claims.

BRIEF DESCRIPTION OF THE DRAWINGS

Embodiments of the present disclosure will now be described by way of example only with reference to the accompanying drawings, where like parts are provided with corresponding reference numerals and in which.

DETAILED DESCRIPTION

Figure 1:
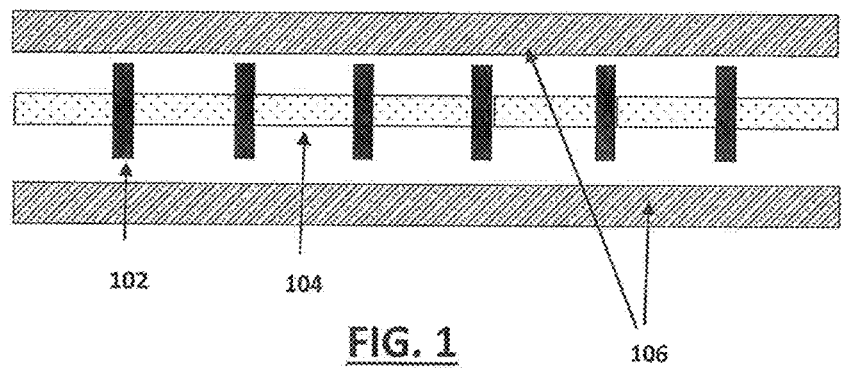
FIG. 1 shows an idealized, schematic drillstring structure

The detailed description set forth below in connection with the appended drawings is intended as a description of presently preferred embodiments of the disclosure, and is not intended to represent the only forms in which the present disclosure may be practised. It is to be understood that the same or equivalent functions may be accomplished by different embodiments that are intended to be encompassed within the spirit and scope of the invention. In the drawings, like numerals are used to indicate like elements throughout. Furthermore, terms such as "comprises", "comprising", "contains" or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

Exploring for and exploiting underground resources (such as underground oil, gas, shale, hydrothermal or artesian resources) has become increasingly sophisticated. Much of the exploration is carried out by equipment delivered to the exploration site by means of drilling. Any portion of the drilling operation below the site of a wellhead is referred to as "downhole". New technologies such as high-temperature sensor technology and downhole navigation increase the demand for reliable and effective communication downhole as well as between transceivers above the wellbore and those below.

Communications can be very challenging to implement at the exploration site as they are typically remote (often offshore and hundreds or thousands of meters below sea level) and the downhole environment can vary a great deal in terms of the surrounding geological features and the thermal and mechanical properties of the materials present in an established well (such as the pipework (e.g. drillstring, riser, etc.) and production tubing, casing, lining, mud, hydrocarbons (i.e. "product"), lubricants and seawater).

Wireless communication using electromagnetic waves, such as radio frequency EM waves, is well known, as is short range optical frequency EM waves communications. For "in-well" communications, the medium is often solid—for instance, a drillstring, a casing or a riser—so other communications techniques are adopted. Both EM communications technologies suffer disadvantages in providing in-well and underwater communications. For in-well and many underwater applications, it is more usual to adopt acoustic telemetry, mud pulse telemetry (using pressure pulses that propagate within the column of drilling fluid inside the drillstring), product pulse telemetry (using pressure pulses that propagate within the column of extracted oil/gas or other product inside the drillstring), and/or other ultrasonic technologies.

In acoustic telemetry, for instance, an encoded sound wave (a stress wave) is generated by a suitable transceiver. Typically the sound wave then propagates along the pipework, casing and/or production tubing. A receiver then extracts the data from the signal. The transceiver is typically located downhole, while the receiver is placed at or near the well head, at the surface.

The drillstring may be considered as a series of (steel) pipes of uniform length connected by short couplings having different physical properties, which can effectively limit effective communications to a number of passbands. The issue is discussed in greater detail in an article entitled "Wave impedances of drillstrings and other periodic media", Drumheller. Douglas S, (Journal of the Acoustical Society of America, Volume 112, Issue 6, pp. 2527-2539 (2002)).

As a borehole is extended and/or becomes operational, the environment becomes dynamic. The passbands themselves fade or drift over Lime. For instance, FIGS. 3B to 3E show the spectra of a model drill string as more pipes are added (with 16 pipe sections in FIG. 3B, 21 pipe sections in FIG. 3C, 36 pipe sections in FIG. 3D, and 41 pipe sections in FIG. 3E): the changes shown here are typical of the changes observed as a borehole is extended.

Figure 2:
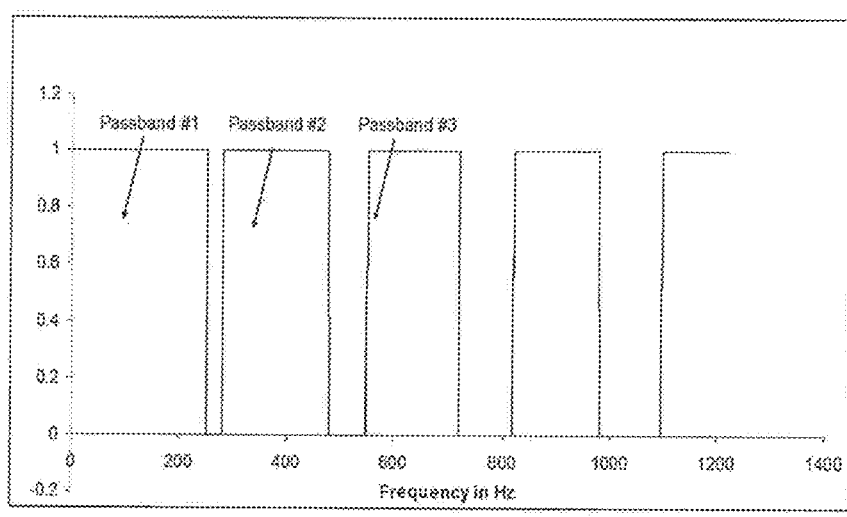
FIG. 2 illustrates the spectral response of a typical drillstring.

FIG. 1 shows an idealised drillstring structure (representing unit cells of pipe 104 and joint 102 within a surrounding casing 106) and FIG. 2 illustrates the spectral response of a typical drillstring. Any communication solution that uses the drillstring as the wave-guide must utilise suitable parts of the spectrum for data transmission. As can been see from FIG. 2 the spectrum consists of a number of pass- and stop-bands, successful data transmission is only possible in the passbands.

The periodic structure of a typical drillstring causes it to act as a mechanical filter; trapping (i.e. damping) all the signals with frequencies that lie within certain bands. The filtering effect occurs predominantly at the early stages of the structure. The filtered nulls, where frequencies do not propagate, are called stopbands; the frequencies where signals are allowed to propagate are called passbands. Additional factors affect the transmission path and attenuation (energy loss) of the propagating signal—such as tension, compression, wall contact, drilling fluid density and mode coupling.

Within these passbands there are a number of instabilities. Firstly, their exact position and width varies from well to well, and can also vary dynamically during communications. As will be shown later, these issues have led to implementations where only one band is chosen and only a narrow central area of the band is used in order to avoid any ambiguity as regards where the passband actually is. The bands themselves also have a ripple (or 'fine structure'), see FIGS. 3A to 3E. The number of pipe sections that the transmission energy has to pass through primarily determines the number of ripples. The ripples also vary (in a drilling application) over time with the changes in the depth and deviation of the well.

Figure 3A:
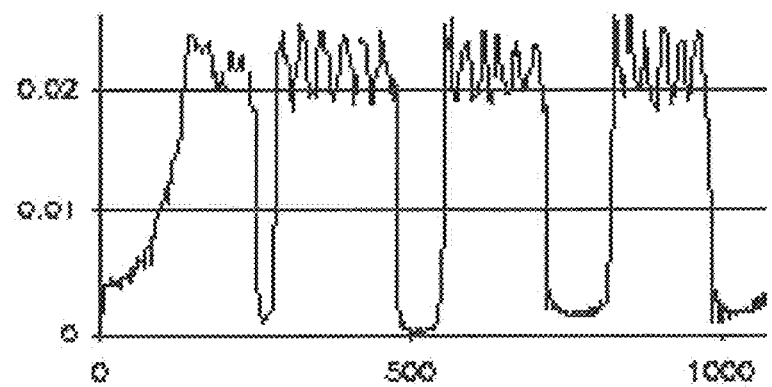
FIGS. 3A to 3E illustrates models of the spectral response for different lengths of drillstring showing passbands having varying degrees of attenuation at different frequencies, each Figure shows a typical Passband Ripple.
Figure 3B:
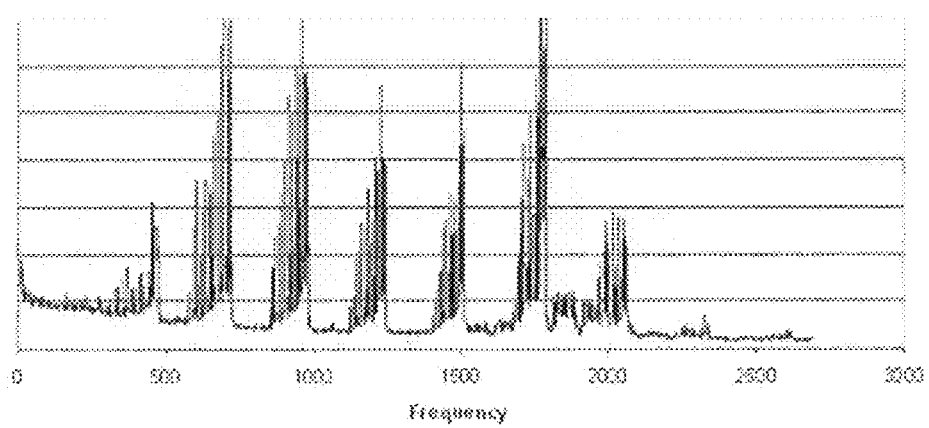
Figure 3C:
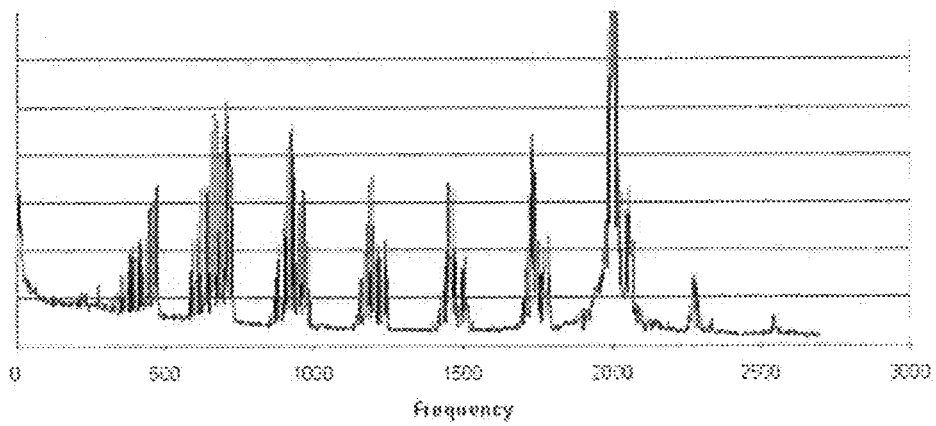
Figure 3D:
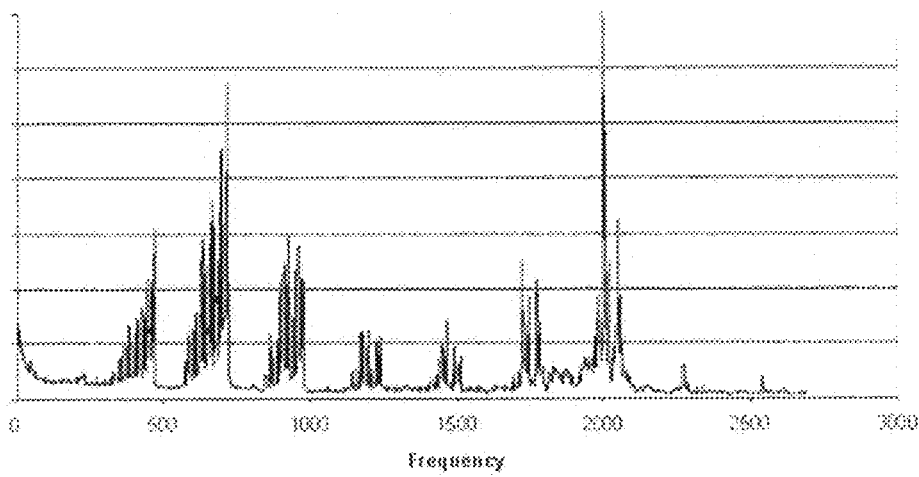
Figure 3E:
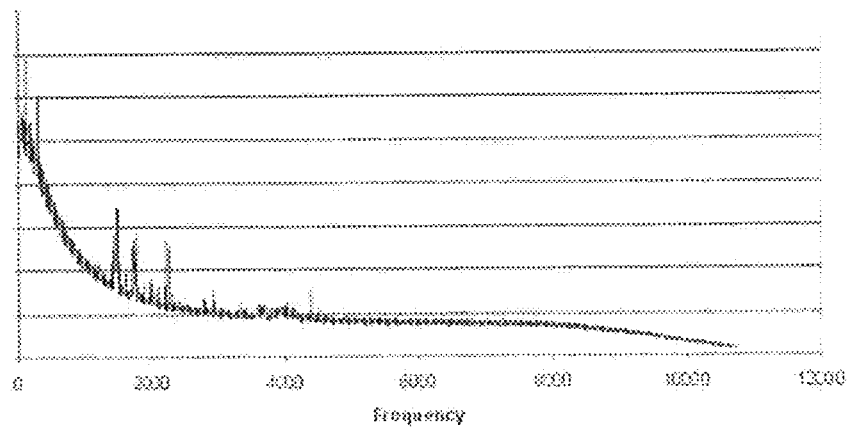

For example, the noise in the channel may reduce or the attenuation may change thus providing an increase in usable bandwidth. In the case of FIG. 3E, not only does the drillstring have more sections but the frequency dependent attenuation is more pronounced as the pipe sections here have been laid on the ground rather than mounted on isolating blocks.

Certain bands may have more noise in them than others at any given time. Alternatively, as noted above in the case of acoustic telemetry, the frequency of a "passband" (where communication is considered more effective) may vary over time.

As noted previously, the conditions for wireless communications (using, for example, radio, optical, acoustic and/or ultrasonic technologies) in the downhole environment are typically hostile. Part of the hostility is the presence of dynamically changing conditions.

It should be noted that research into the acoustic properties of coiled tubing indicates that coiled tubing is acoustically joint-less for long distances despite the welds (for example, helical welds) on the coiled tubing and it has a bandwidth of at least 2 kHz. Therefore, the passband of coiled tubing is relatively wide (in comparison to those in jointed drillstring) and therefore allows higher telemetry rates. In view of this available bandwidth, broadband signalling techniques can be applied to downhole wireless communication using coiled tubing, channel distortion presents less of an obstacle to such broadband techniques. The use of telemetry on coiled tubing thereby provides additional data communication bandwidth.

Wireless acoustic telemetry uses a solid medium (such as a jointed pipe or riser) as the mechanism for transmitting sound waves that contain data. In a typical oil industry scenario, a transmitter/receiver (Tx/Rx) tool is situated downhole and communicates with a Tx/Rx tool on surface. Two-way communication is a standard feature using sound waves both up and down the pipe. Current technology requires repeaters to boost the data-carrying sound wave over long distances, due to loss in the intensity of the signal, whilst the data transfer rate offered by such these systems is limited to around 40 bits per second. For further background information, the reader is referred to an article entitled "An Overview of Acoustic Telemetry" by Drumheller, D. S, [Sandia National Laboratories, SAND-92-0677C].

The 40 bits/s data transfer rate is a mild improvement over the data transfer rates typical for traditional wireless telemetry systems such as mud pulse and electromagnetic (EM).

Limitations on data transfer rates and the requirement for signal boosters are understood to arise because the complex structure of down-hole jointed pipework creates a very difficult communication channel (this is the subject of another article by Douglas S Drumheller—"Acoustical Properties of Drill Strings" [Sandia National Laboratories, Report SAND88-0502. UC-66c, July 1988]). The tool joints and tool bodies create a series of short and long resonators. This alternating resonant structure allows certain groups of frequencies to pass through the structure (passbands) whilst stopping others (stop bands). For further discussion of acoustic telemetry in drillstrings, the reader is referred to the previously mentioned article entitled "Wave impedances of drill strings and other periodic media" by Drumheller.

Some of the factors that affect the intensity of the transmitted sound wave as it propagates along the jointed pipe are the characteristics of the well/casing, the deviation of the well, the extent of the contact between pipe and formation, the type of jointed pipe and its construction and whether or not there are packers in the transmission path. Any instantaneous variation in one or more of these could reduce the intensity of the sound wave and adversely affect communication.

Figure 4:
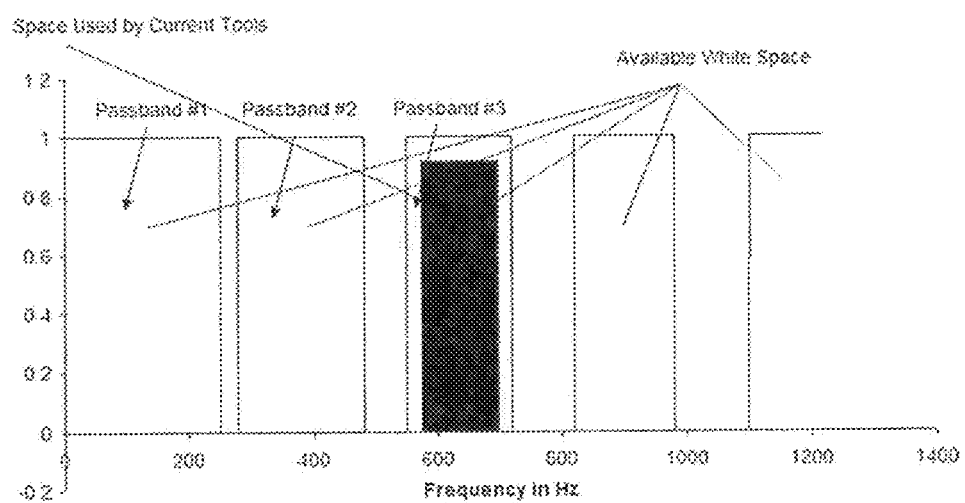
FIG. 4 illustrates a typical set of Passbands and Stopbands.

In FIG. 4, we see a typical set of passband frequencies (which might collectively be termed "white space") that are allowed to pass through a theoretical jointed pipe structure. The gaps between the white space bands represent the frequencies that are stopped or trapped within the jointed pipe. The white space represents the frequencies that are available to enable transmission of the data-carrying sound waves.

The effective range of operating frequencies for acoustic telemetry is believed to extend between 400 Hz and 2000 Hz: this one of a number of design considerations discussed in "Design Considerations for a New High Data Rate LWD Acoustic Telemetry System" Vimal, S. et al. [Society of Petroleum Engineers Paper. SPE 88636, October 2004]. This effective range suggests that a higher bandwidth is available than that of traditional wireless telemetry systems. Yet developers have been unable to take advantage of the higher bandwidth in order to significantly increase data transfer rates.

The instantaneous variability (and noise) in the well means that current acoustic telemetry system developers have difficulty in locating the frequencies of all of the passbands, and therefore they limit their systems by electing to use only the central portion of a known band, or bands, to improve the chances of transmission. One such elected central portion of a passband is represented by the black segment in FIG. 4. This approach limits the bandwidth used by the data carrying sound wave and in turn reduces the bit rate.

Certain known systems transmit in or near the respective centres of a plurality of the higher frequency bands in an effort to maximise transmission success. They avoid the lower bands of white space frequencies, e.g. 0-250 Hz and 300-475 Hz, because they are filled with environmental noise and deemed unsuitable. In all current systems, relays are always required to boost the signal beyond a maximum of 2,500 m in a vertical deployment and 950 m in a horizontal deployment.

The authors have observed that larger bandwidths are also the key to controlling the noise levels during communications.

Certain downhole communications systems use chirp pulses to aid signal propagation. A chirp pulse offers a high signal to noise ratio and therefore allows transmission through high noise environments. In the case of a Chirp, the longer the pulse length the better the immunity to noise, however, current designs have to lower their bit-rate with increased chirp length.

The conventional systems also rely on using a narrow section of the passbands in order to ensure that any variation in width or position of the band is compensated for. Only one passband is used in general, again limiting the performance and flexibility of the device.

In summary, current systems have limited their technical solution in order to gain reliability but have sacrificed performance, flexibility, and (ironically) reliability.

In an article entitled "On the Utility of Chirp Modulation for Digital Signaling", by Albert J. Berni and William D. Gregg, (IEEE Transactions on Communications, June 1973), a channel calibration system is described where a chirp signal is swept down the channel and a Fast Fourier Transform, FFT, is used to determine the phase and amplitude spectrum for the channel. This technique however has no noise immunity and requires pumps and drilling to stop during calibration phase: furthermore certain passbands (those at lower frequencies, bands 1 and 2 in FIG. 4) cannot be calibrated due to high background noise.

This prior system requires a bottom end modem to transmit a sequence of reference signals in the passbands that it is going to use. Digital phase lock loops are then used to detect these passband carrier tones. This approach is fragile as channel noise is likely to block these reference signals, especially in bands 1 and 2.

Figure 5:
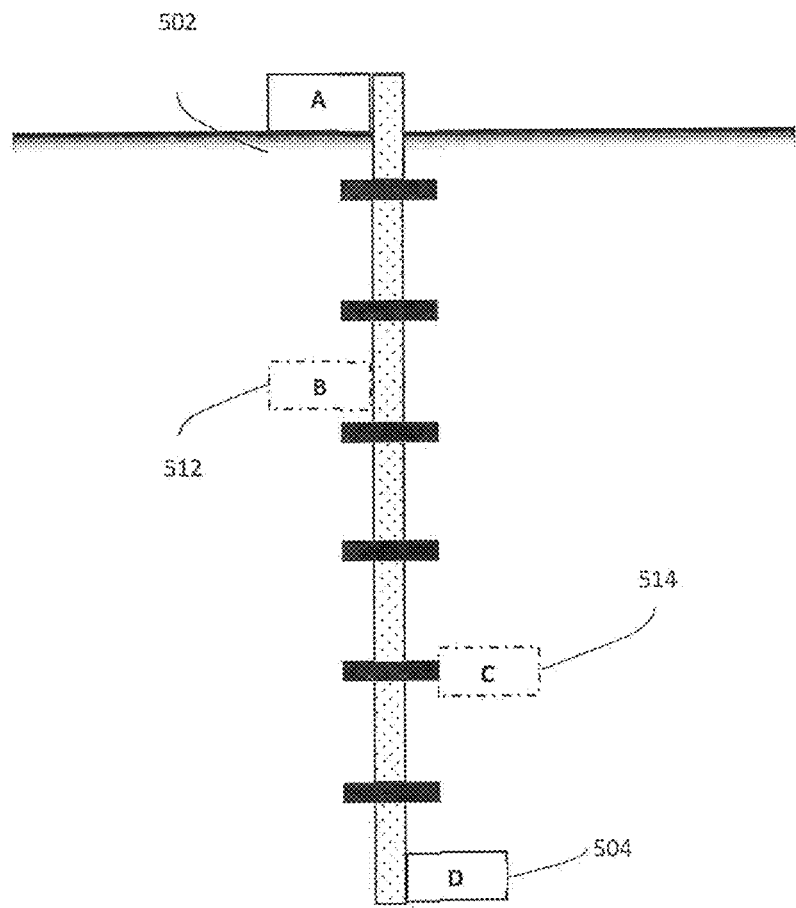
FIG. 5 illustrates an exemplary deployment of modem units suitable for use with embodiments of the present disclosure.

FIG. 5 illustrates the arrangement of certain functional components in an exemplary acoustic telemetry system. The system consists of a number of modem units connected acoustically to each other through the drillpipe or coiled tubing. The process contains at least two modem units, each capable of transmitting and receiving signals between each other. These modem units are denoted A 502 and D 504, such that unit A 502 is the surface end of the transmission path and unit D 504 at the downhole end. Optional, additional, modem units B 512 and C 514 lie somewhere between modem units A 502 and D 504.

Intermediate modem units along the transmission path from the two ends of the communication path (in this case B 512 and C 514), can be of two types: either nodes or repeaters. Repeaters are required when reliable communications cannot be established between the two end modem units (A 502 and D 504, in this case). The reason could be loss of signal in noise. Repeaters may also be used to transmit local pressure and temperature signals from points along the string.

Nodes are similar but do not re-transmit signals along the channel. That is, communications between the end modems can be achieved without the intervention of any nodes. The nodes treat the communications between the end modems as an acoustic backbone on to which they can piggy-back communications using TDM (time division multiplexing techniques).

Figure 6:
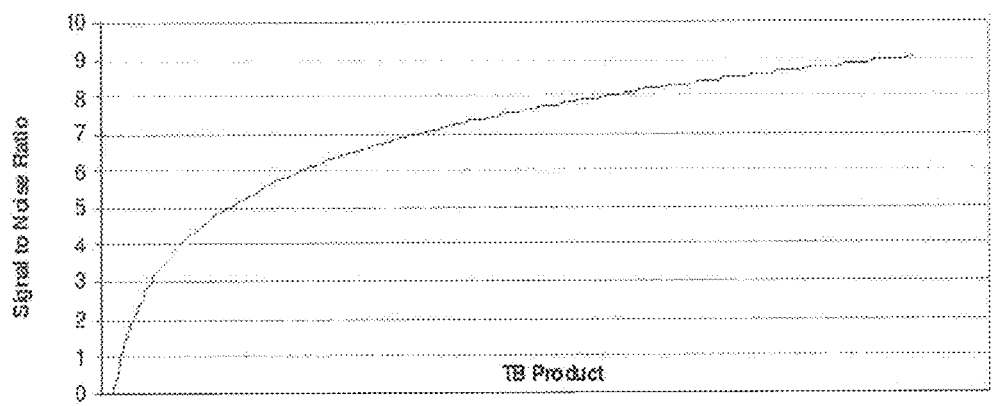
FIG. 6 illustrates the variation of signal to noise ration with increasing TB product, equation (1)

As previously noted, a property of chirp pulses is that the longer a given pulse is (i.e. the larger the TB product), the greater the immunity it has to noise without loss of resolution. This can be seen from FIG. 6 which shows a plot of TB product against signal to noise ratio.

Figure 7:
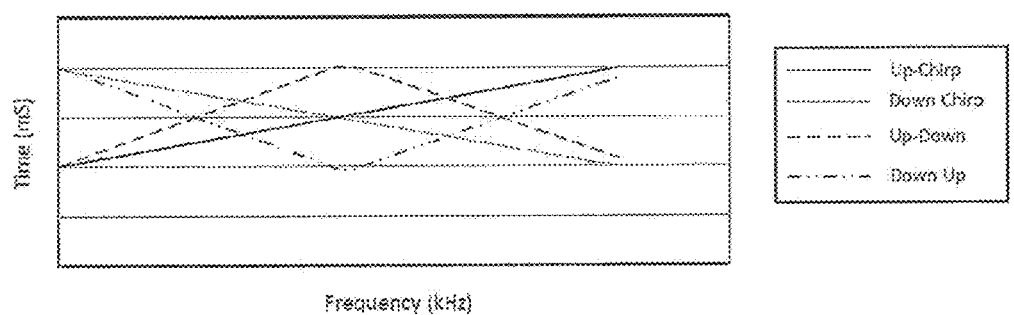
FIG. 7 illustrates various forms of chirp suitable for use with an embodiment of the present disclosure.

The form of the individual chirp pulse can be any pressure wave signal capable of pulse compression: non-limiting examples of suitable pulse forms include the "up" chirp, "down" chirp, "up-down" chirp, and "down-up" chirp illustrated in FIG. 7.

Conveniently, the frequency range F1 to F2 will encompass all the available passbands in the channel. For instance the pulses may sweep frequencies between F1=400 Hz to F2=2 kHz. The reader will however note that pulses are not limited to sweeping frequencies with these bounds.

Figure 8:
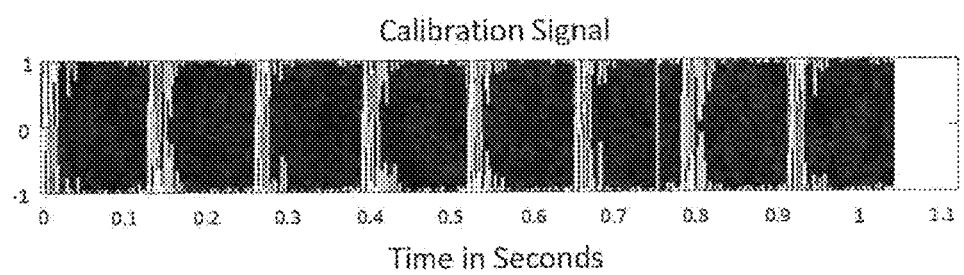
FIG. 8 shows a typical set of eight identical transmission pulses.

Preferably the ensemble of chirp pulses transmitted by modem unit A 502 in operation S602 comprises an integer number, N, of non-overlapping chirp sequences. FIG. 8 illustrates one such ensemble (i.e. a channel calibration Tx sequence) having a set of 8 identical transmission pulses. These pulses serve various purposes. Firstly, they are modified by the channel's transfer function so that information may be encapsulated and recovered by the receiving system.

In addition, the use of such pulses increases the probability of the receiving system (i.e. modem unit D 504) detecting the sequence of pulse under noisy conditions, through unknown passband structures with unknown phase distortion. Chirp pulses also facilitate the provision of an ensemble of reference pulses for the purpose of removing noise as described below.

Figure 9:
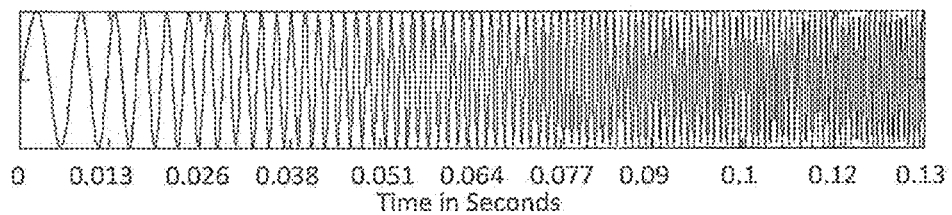
FIG. 9 illustrates a typical Linear Chirp pulse.
Figure 10:
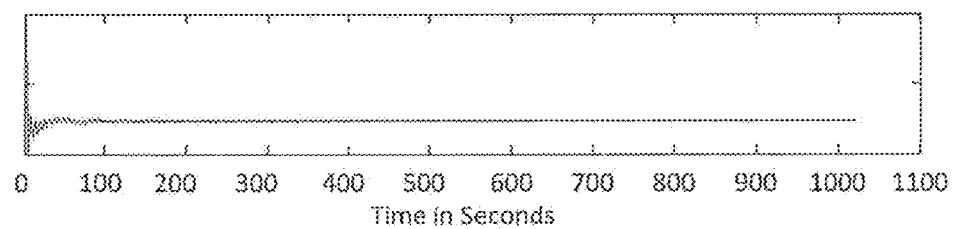
FIG. 10 demonstrates the Auto Correlation resulting from the use of the Chirp pulse in FIG. 9.

These chirp pulses have the property of short autocorrelation sequences and offer a significant gain against noise. There is also benefit in the case of attenuation that is not necessarily due to noise: a signal may fade due to factors such as distance and resistivity of product, mud and/or surrounding geophysical formations. An example of a typical chirp pulse waveform is shown in FIG. 9. FIG. 10 the same pulse delayed and cross correlated with itself (compressed).

Figure 11:
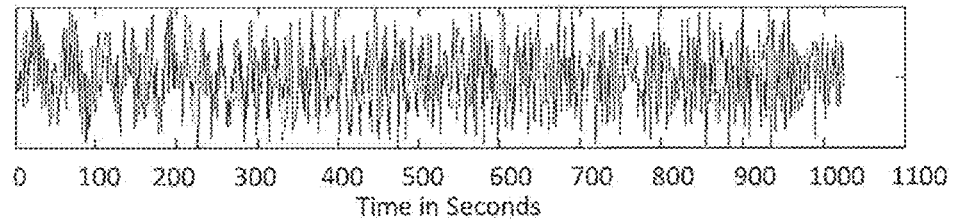
FIG. 11 demonstrates the Chirp from FIG. 9 in 20 dB of noise.
Figure 12:
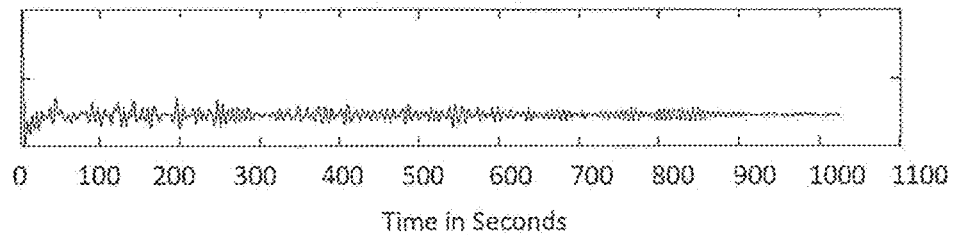
FIG. 12 illustrates the correlation of the signal in FIG. 11 with that in FIG. 9.

FIG. 11 shows the chirp pulse waveform of FIG. 9 in 20 dB of noise. FIG. 12 shows the noisy pulse of FIG. 11 correlated with the pulse in FIG. 9.

As the noise in respective bands within the channel may reduce or increase over time, it becomes necessary to compensate for this "band-limited" noise. Likewise other causes of attenuation may vary over time (as a drillstring is extended and/or touch points change due to mechanical vibrations induced in the drillstring) or be changed by events (such as a change in the propagation medium from mud to product).

To address noise specifically, it is known to adopt a so-called "waterfilling", or amplitude modulation, technique to ensure that a given transmission pulse has more energy in each of at least one noise band of the given transmission pulse. This is normally achieved by selectively increasing the amplitude of the frequency components of that transmission pulse where they lie in a noise band. A similar technique may be adopted to increase the amplitude of the frequency components of transmission pulses where they correspond to bands that experience the greatest attenuation.

Figure 13:
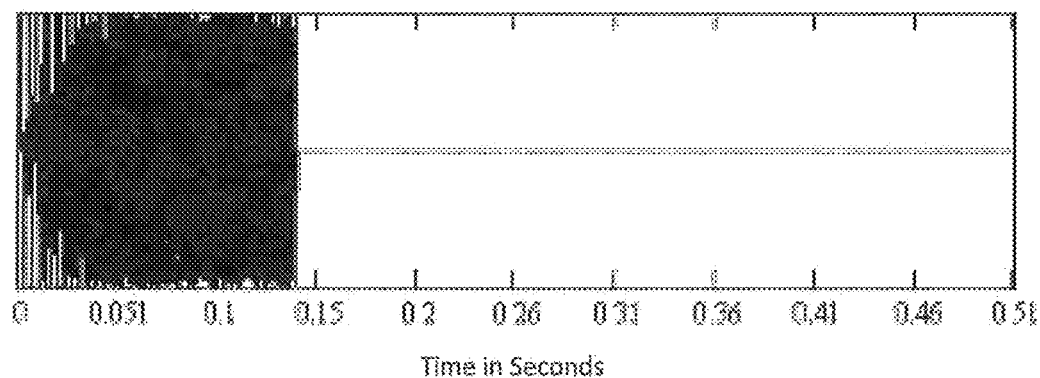
FIG. 13 illustrates a typical time series for a typical up-chirp pulse.
Figure 14:
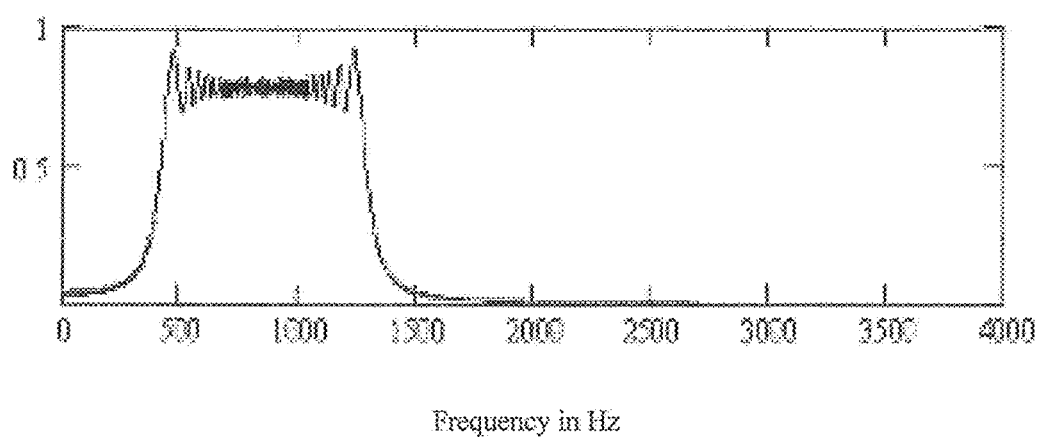
FIG. 14 illustrates the spectrum of the pulse in FIG. 13.

FIG. 13 illustrates the time series for a typical up-chirp pulse, while FIG. 14 illustrates the corresponding spectrum of that pulse.

Figure 15:
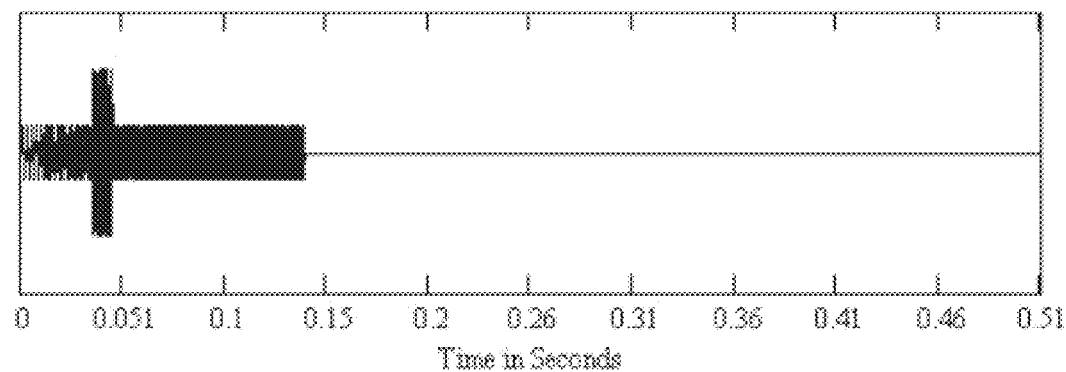
FIG. 15 illustrates a time series that includes a period in which a chirp is transmitted at a higher amplitude in the 550-720 Hz band using the water-filling technique.
Figure 16:
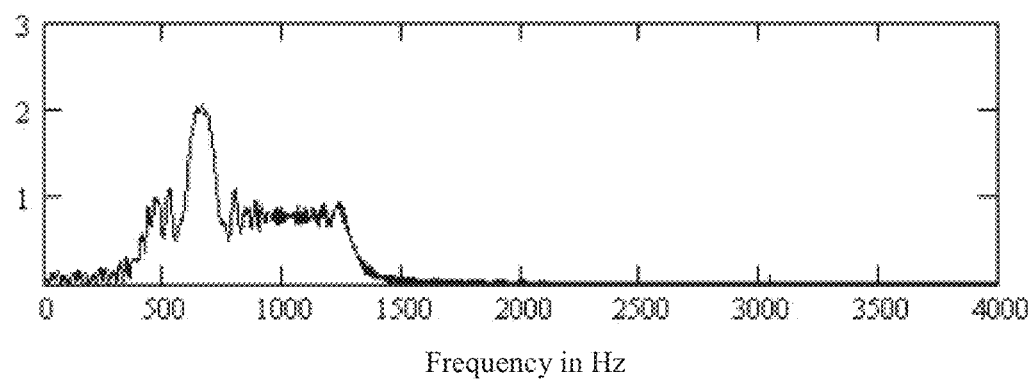
FIG. 16 illustrates the spectrum of the chirp pulse illustrated in FIG. 15.

When water-filling is applied, the amplitude is modulated to compensate for noise (and/or attenuation) in a given frequency band. FIGS. 15 and 16 illustrate the application of water-filling: FIG. 15 shows a time series for a single up-chirp pulse that includes a period in which the chirp is transmitted at a higher amplitude: the high amplitude period is timed to coincide with the portion of the swept pulse corresponding to the 550-720 Hz band—giving a peak in that band in the resulting chirp spectrum illustrated in FIG. 16.

The above method of noise compensation has a number of drawbacks. In particular, amplitude modulation requires a power amplifier capable of delivering large increases in power level over relatively short time scales. Furthermore the power amplifier must be configured to deliver peak powers far in excess of what is normally required of it.

Chirp pulses can be generated over longer times in order to compensate for noise. However, lengthening the pulse has the side effect of increasing noise immunity in spectral bands where the noise is low and that increased immunity is not required. This is energy inefficient as more power is being applied to bands that do not require it.

It has been realized that rather than lengthen the chirp pulse over the entire frequency range of the swept pulse, it is possible to lengthen that part (i.e. frequency range) of the chirp pulse that lies in the noise (or attenuation) band.

Figure 17:
FIG. 17 illustrates the local extension (over time) of a chirp pulse in accordance with the present disclosure.

A simple example is shown in FIG. 17. Here the chirp sweeps a range from F1 to F4, however the portion of the sweep in frequencies is extended over a relatively longer time in the frequency range between F2 and F3.

This can be illustrated in a specific example contrasting a chirp pulse before the application of the concept illustrated in FIG. 17 and that after.

Figure 18:
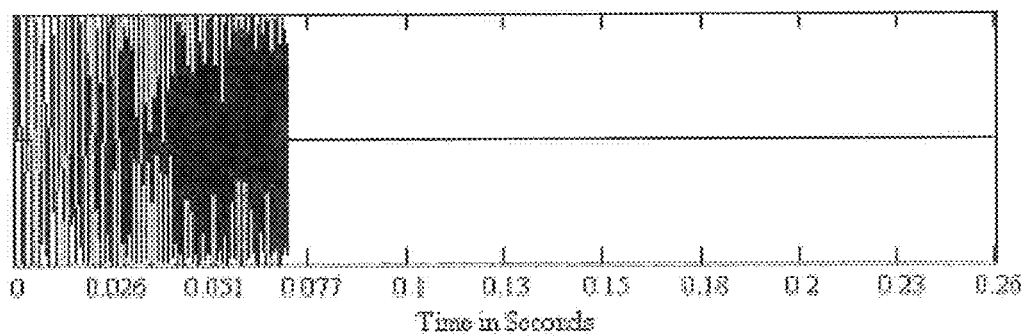
FIG. 18 illustrates a time series for an exemplary chirp pulse sweeping from 400 Hz to 1300 Hz.
Figure 19:
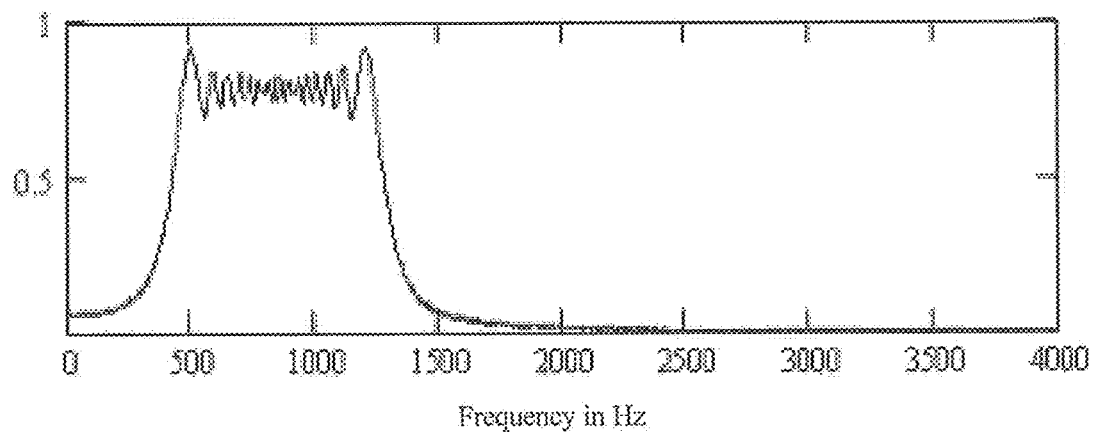
FIG. 19 illustrates the spectrum of the pulse in FIG. 18.

FIG. 18 illustrates a chirp with a TB=64 sweeping from 400 Hz to 1300 Hz, with the corresponding spectrum shown in FIG. 19. No compensation for noise or attenuation is applied.

Figure 20:
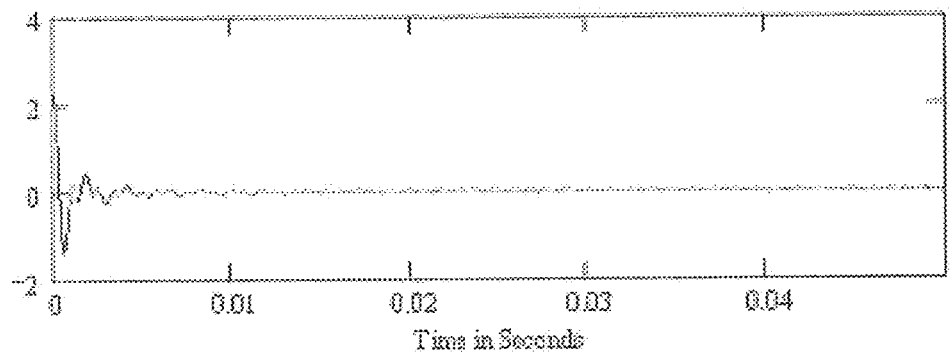
FIG. 20 shows the time series for the pulse in FIGS. 18 and 19, delayed and cross correlated with itself.

FIG. 20 shows the time series for the pulse in FIGS. 18 and 19 delayed and cross correlated with itself (i.e. decoded).

Figure 21:
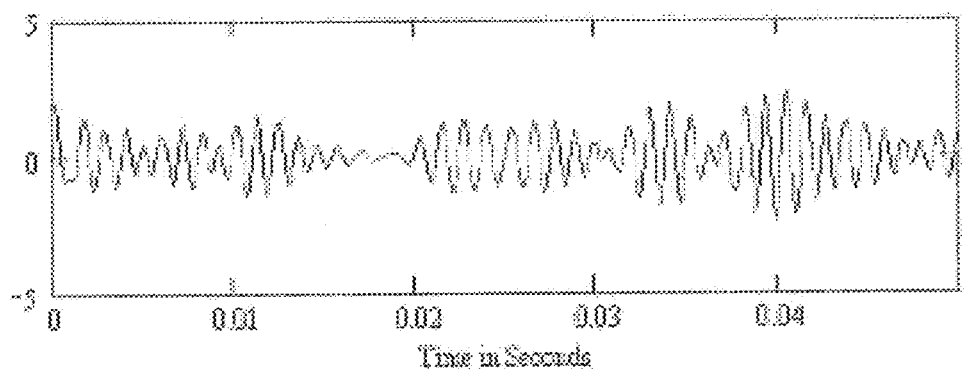
FIG. 21 shows the chirp pulse waveform of FIG. 18 in 20 dB of white noise added the band between 700-1000 Hz.

FIG. 21 shows the chirp pulse waveform of FIG. 18 in 20 dB of white noise added the band between 700-1000 Hz.

As will be readily appreciated, attenuation (with a frequency dependence) may also be modelled in a similar way. Indeed, the basic principal of selectively lengthening part(s) of the frequency range of a chirp pulse can be applied to any part of the spectrum that is weak (i.e. signal gain is low compared to other parts of the spectrum), whether that weakness is due to attenuation or the presence of noise levels above the mean for the spectra occupied by the chirp transmission. The claimed technique can thus be used to compensate for variations in the strength of pass bands in the channel.

Figure 22:
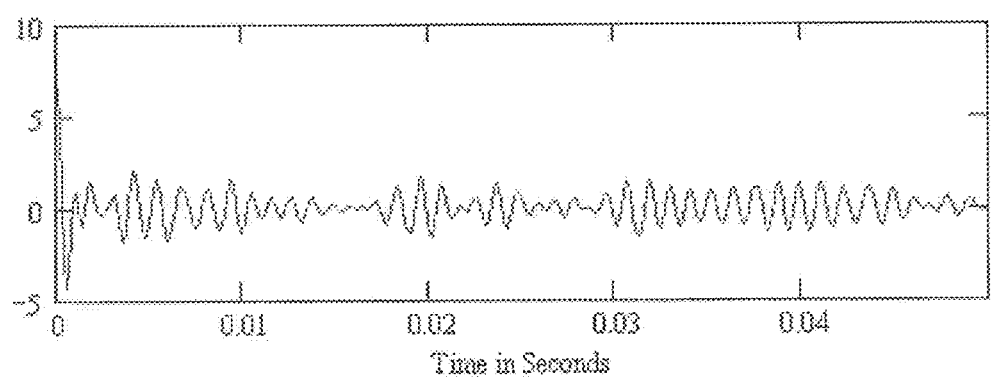
FIG. 22 illustrates a time series in which the TB product is increased over the entire bandwidth of the sweep in accordance with the related art.

The conventional method of combating the above noise (or attenuation) is to increase the TB product of the chirp sweep overall. Using a TB of 512 recovers the chirp from the noise as shown in FIG. 22.

Although this works, it also adds additional energy across the full bandwidth of the sweep.

The chirp pulse used in FIG. 21 (TB=64 over a linear sweep of 400-1300 Hz=900 Hz bandwidth) has a net TB in the noise band (i.e. between 700-1000 Hz, a 300 Hz bandwidth) of 7. The TB product over the noise band calculated as follows:

$$TB_{Noise} = \frac{BandwidthNoise^2}{BandwidthSignal^2} \cdot TB_{Signal} \quad \text{(eq. 2)}$$

Thus TB for the noise band is $64*(300)^2/(900)^2=64/9=7$.

By the same equation, the net TB in the noise band for the TB=512 pulse (used to generate FIG. 22) is 57. Thus a TB=57 over the noise band delivers a decoded pulse greater than the 20 db of in-band noise using the conventional method.

By extending the pulse only in the part of its sweep covering the noise (or attenuation) band, the additional energy required can be reduced significantly. Thus, where F1=400 Hz, F2=700 Hz, F3=1000 Hz and F4=1300 Hz in FIG. 17, starting the sweep from F1 with a chirp of TB=64, the section of the pulse lying in the noise band (net TB=7) is "stretched" by a factor of 10 to give a TB of 70 in the noise band, then that should provide a pulse that will overcome the in-band noise. The resultant pulse uses 25% of the energy (greater in narrowband noise) compared to the extension of the entire pulse bandwidth (as in FIG. 22).

Thus, in the modelled example, a locally extended chirp pulse might use TB=70 for the section of the pulse to which the randomized noise is added. In typical cases, it is assumed that the required S/N is 10 over the noise band, so (from equation 1) this equates to requiring a TB=100 in the portion of the 400-1300 Hz band over the 700-1000 Hz region. The original un-equalised chirp wave form is given by $$T(n) = \sin\left(2\pi.(F_{end} - F_{start}).\frac{n}{2.Pl} + F_{start}\right).\frac{m}{F_s} \quad \text{(eq. 3)}$$

Where Pl is the pulse length in samples, Fs is the sampling frequency in Hz. and n is the sample number. In this case $F_{end}$=1300 Hz and $F_{start}$=400 Hz (F4, F1 in FIG. 17).

The emphasised pulse is built by using the original sections from equation 3 in the ranges 400-700 Hz and 1000-1300 Hz and inserting a new section in the range 700-1000 Hz (replacing the original section in the range 700-1000 Hz from equation 3) given by the following equation:

$$T_{New}(n) = \sin\left(2\pi.(F_{NoiseStop} - F_{NoiseStart}).\frac{n}{2.Pl_{new}} + F_{NoiseStart}\right).\frac{n}{F_s} \quad \text{(eq. 4)}$$

Where $Pl_{new}$ is the length of the extended section of the chirp in samples, and, in this case $F_{NoiseStop}$=1000 Hz and $F_{NoiseStart}$=700 Hz.

Figure 23:
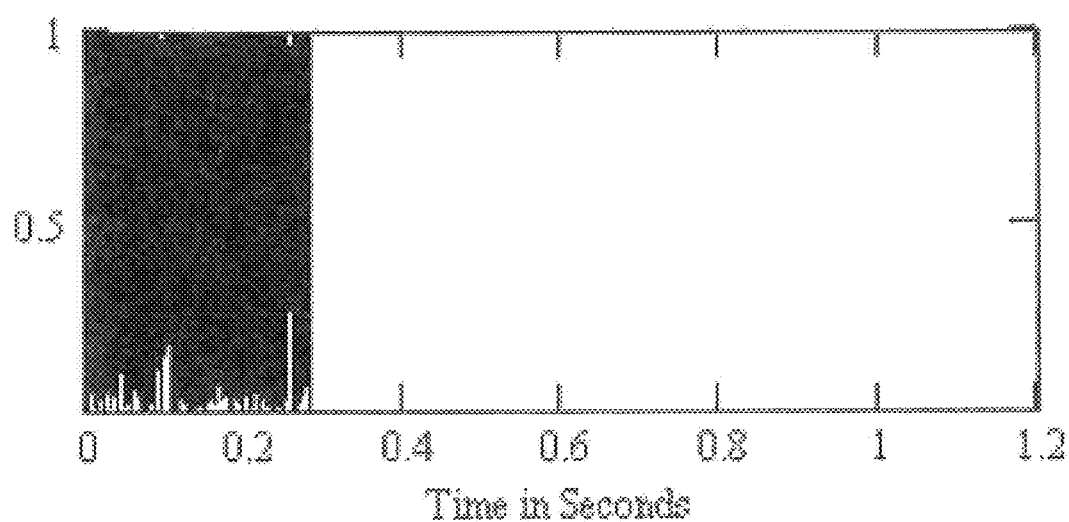
FIG. 23 illustrates a time series of a locally extended chirp in accordance with an embodiment of the present disclosure.
Figure 24:
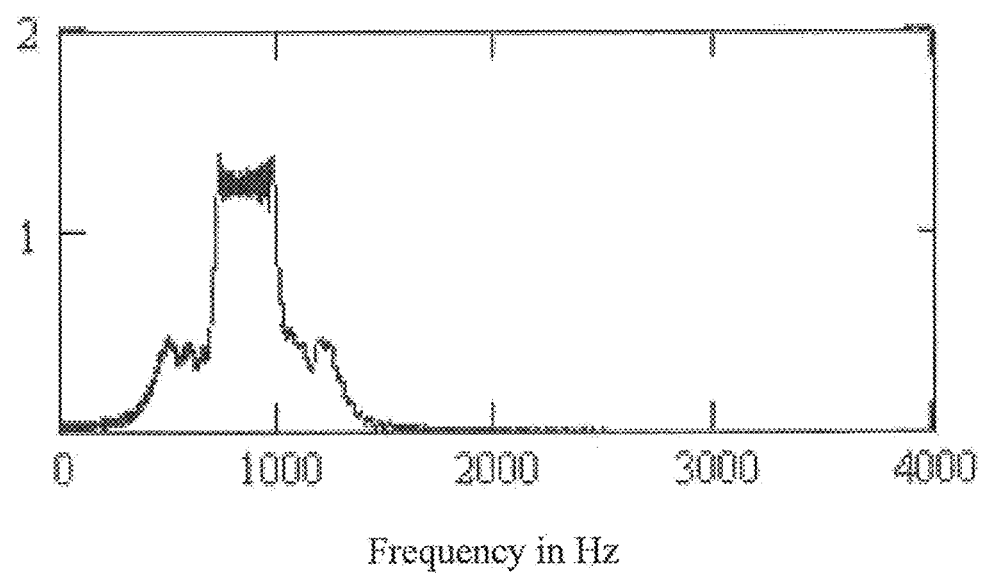
FIG. 24 illustrates the spectrum of the locally extended chirp in FIG. 23.

FIGS. 23 and 24 respectively show the time series and spectrum of the extended chirp in accordance with an embodiment of the present disclosure. It will be observed that the amplitude of the pulse is constant over the time series but that the spectrum (FIG. 24) shows the pre-emphasis of the signal over the noise band, $F_{NoiseStart}$=700, $F_{NoiseStop}$=1000 Hz (F2, F3 in FIG. 17).

Figure 25:
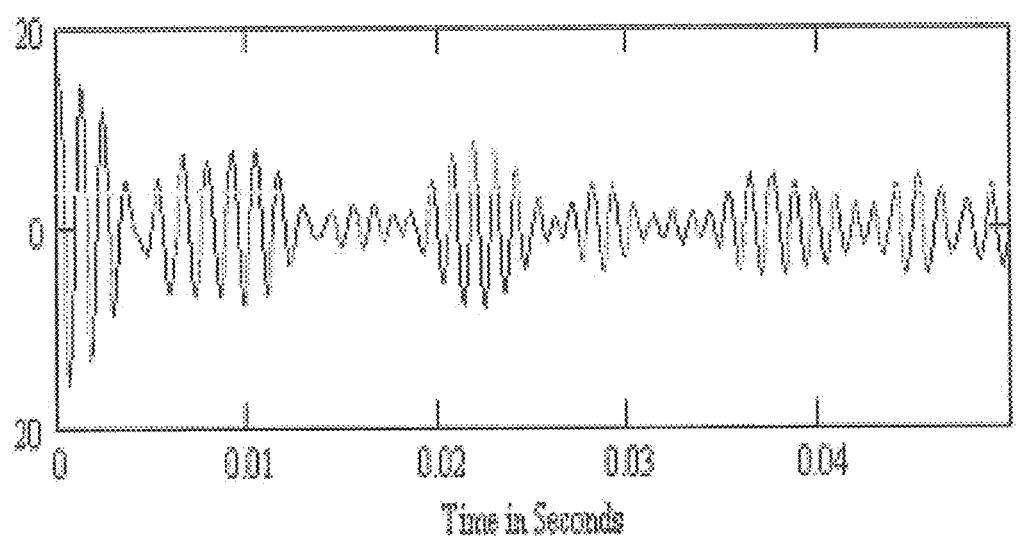
FIG. 25 illustrates a time series of the output of a receiver correlator using a chirp identical to the locally extended chirp in FIG. 23.

The same function (as illustrated in FIG. 24) could be used in the receiver correlator however the pre-emphasis of the waveform narrows its effective bandwidth and increases the width of the decoded pulse, see FIG. 25.

Although the decoded signal is above the level of the noise, it has been widened. In order to recover the full bandwidth of the signal, the receiver must implement a complementary de-emphasis function (i.e. correlation sequence).

As will be discussed below, in cases where it is intended to compensate for attenuation rather than noise, de-emphasis is not required. This is because the greater power in the attenuation band is required to counter a (local) reduction in receive power rather than to achieve a power level that exceeds the level of noise by a significant margin.

Figure 26:
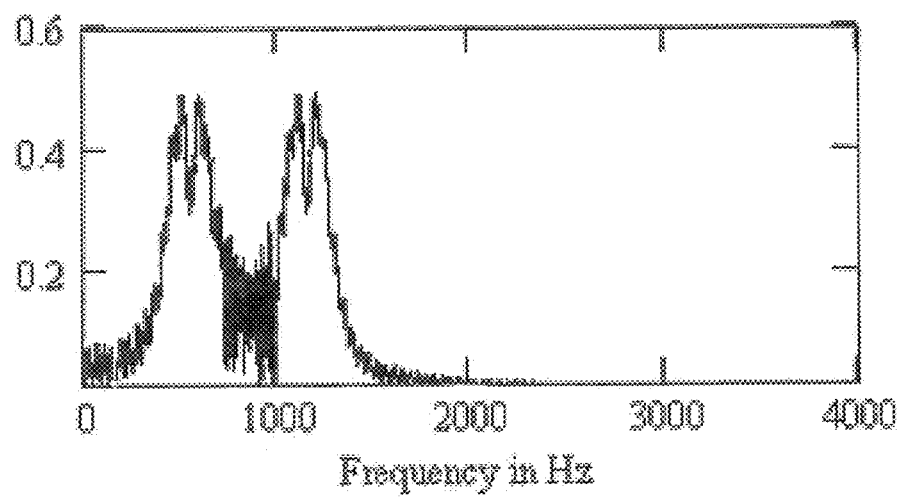
FIG. 26 illustrates the spectrum of a function (i.e. correlation reference sequence) used by a receiver correlator to de-emphasise signals transmitted using the locally extended chirp in FIG. 23.

FIG. 26 shows the spectrum (i.e. a correlation reference) used at a correlator module of the receiver showing that the noise band spectrum is suppressed thus compensating for the gain in transmission signal, and also suppressing the in-band noise.

Figure 27:
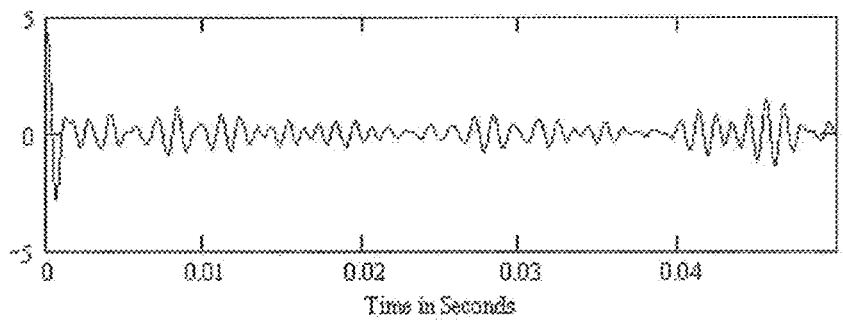
FIG. 27 illustrates a time series for the chirp of FIG. 23 recovered from the noise by the receiver correlator.

The equalised correlator function in FIG. 26 recovers the original broad band pulse from the noise. FIG. 27 illustrates the degree of correlation and compares favourably with FIG. 22).

Figure 28:
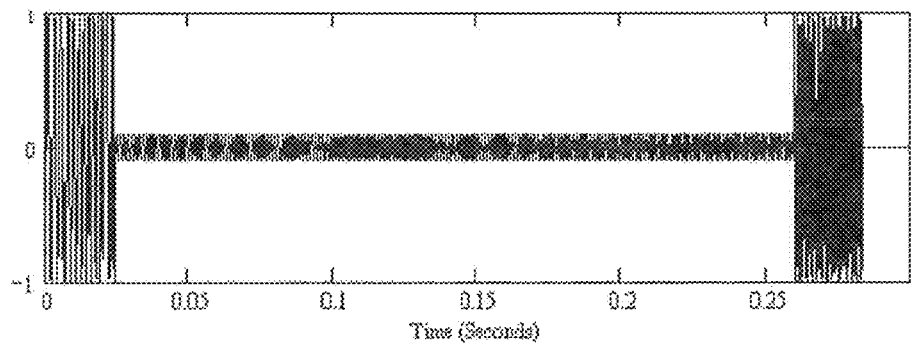
FIG. 28 illustrates a time series for the correlation reference sequence of FIG. 26.

The reference transmission emphasised sequence is described above (see FIGS. 23 and 24). The de-emphasised correlation sequence is identical except that the amplitude of the equalised section as described above is attenuated in amplitude by the gain applied to this section (in this case, by a factor of 10), see FIG. 28.

In the foregoing simulations, the reader should note that an exemplary 20 dB of (Gaussian white) noise was applied unless otherwise indicated. In certain cases, the white noise is applied in a certain frequency band (say 700 MHz to 1100 MHz) to model a frequency dependent noise effect. Where attenuation is to be modelled in a given frequency band, this can be done by applying a frequency dependent weighting factor to the model of a received signal.

Figure 29:
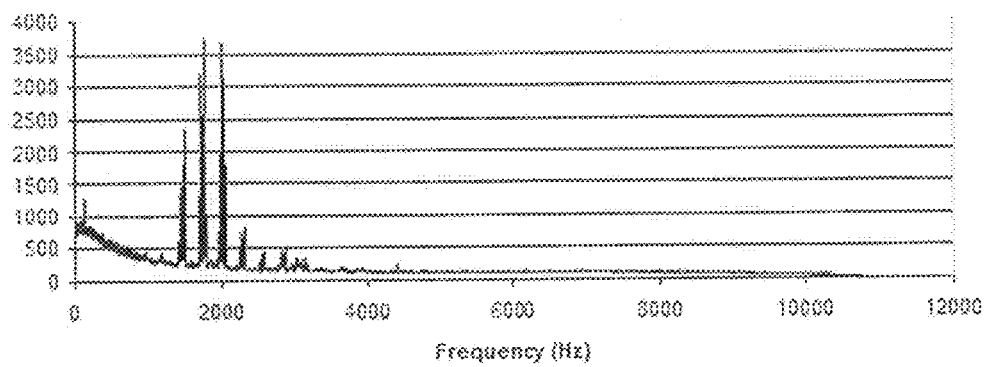
FIG. 29 illustrates the attenuated (dampened) spectral response for a long pipestring.

As noted previously, the above technique can equally be used to compensate for weaker areas of the transmission spectrum, i.e. passbands of lower gain than others. FIG. 29 shows an example of a spectrum of an actual transmission line constructed of drill pipe (compare this with FIG. 3E for a 41 pipe section drill pipe laid on the ground). While the three pass bands at or below 2000 Hz are prominent, those at higher frequencies are significantly attenuated. Local extension of the chirp at these frequencies may thus be used to compensate for this comparative weakness.

Figure 30:
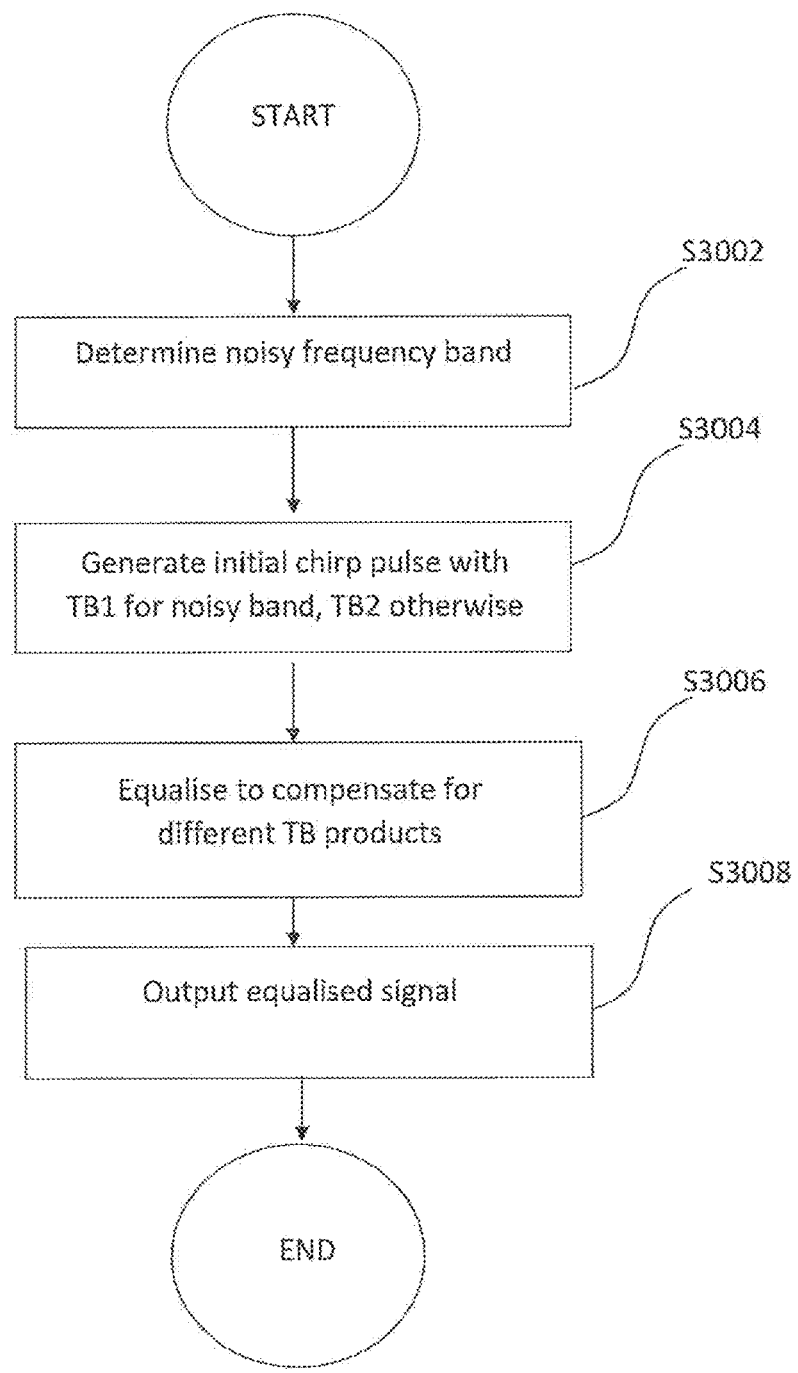
FIG. 30 illustrates a process sequence in accordance with certain embodiments of the present disclosure.

FIG. 30 illustrates a process sequence showing the main stages of a noise compensation method in accordance with certain embodiments of the present disclosure.

At step S3002, a chirp pulse generator apparatus, such as an acoustic transducer (i.e. a transceiver), which is operable over a plurality of frequency bands, determines which, if any, of the frequency bands (i.e. the "first" frequency bands) have propagation characteristics different from other frequency bands in that they experience a level of noise higher than that at the other frequency bands.

At step S3004, the apparatus generates an initial chirp pulse having a time bandwidth, TB, product with a first value for frequencies in the or each first frequency band and a TB product with a second value for frequencies in bands other than the or each first frequency band, the second value being lower than the first value.

At step S3006, a receiving apparatus equalizing the initial chirp pulse by applying a correlator function. The correlator function having an amplitude modulated for that portion of the swept chirp pulse in which the first TB value is generated.

At step S3008, the receiving apparatus is able to output an equalized signal where the noise is significantly attenuated yet the pulse length is restricted to a length capable of supporting a chirp pulse.

Figure 31:
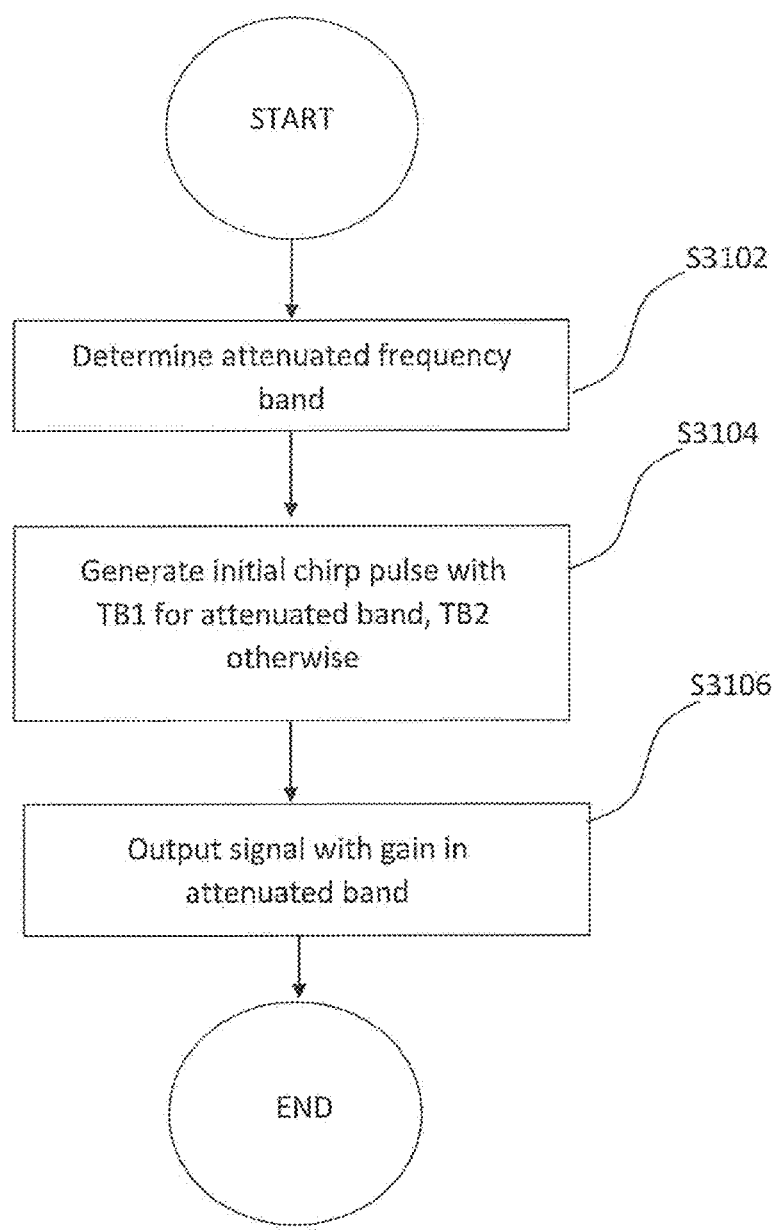
FIG. 31 illustrates a further process sequence in accordance with certain embodiments of the present disclosure.

FIG. 31 illustrates a further process sequence showing the main stages of an attenuation compensation method in accordance with certain embodiments of the present disclosure.

At step S3102, a chirp pulse generator apparatus, (e.g. acoustic transducer or other suitable transceiver), which is operable over a plurality of frequency bands, determines which, if any, of the frequency bands (i.e. the "first" frequency bands) have propagation characteristics different from other frequency bands in that they experience a level of attenuation greater than that at the other frequency bands.

At step S3104, the apparatus generates an initial chirp pulse having a time bandwidth, TB, product with a first value for frequencies in the or each first frequency band and a TB product with a second value for frequencies in bands other than the or each first frequency band, the second value being lower than the first value.

At step S3106, a receiving apparatus applies a correlator function corresponding to the initial chirp pulse thereby outputting a signal where the attenuation is significantly reduced yet the pulse length is restricted to a length capable of supporting a chirp pulse.

Furthermore, while the specific examples discussed above refer to drillstrings, the reader will appreciate that the same techniques may equally be applicable and applied to a broad range of other communication channels, including channels that may also be found in downhole and undersea such as a casing channel and a production tubing channel.

The description of the preferred embodiments of the present invention has been presented for purposes of illustration and description, and is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims and their equivalents.

What is claimed is:

1. A method for generating a plurality of chirp pulses for use in a communication channel, the channel being operable over a plurality of frequency bands, the frequency bands including at least one first frequency band having propagation characteristics different from other frequency bands, the method comprising, at a chirp pulse generator:
   determining the at least one first frequency band having propagation characteristics different from other frequency bands in that a signal transmission in the at least one frequency band experiences a level of noise or attenuation greater than that at the other frequency bands; and
   in dependence on the determining, generating an initial chirp pulse having a first value of time bandwidth, TB, product value for frequencies in the at least one first frequency band of the communication channel and a second value of TB product for frequencies in bands of the communications channel other than the at least one first frequency band, the second value being lower than the first value.

2. The method as claimed in claim 1, wherein the initial chirp pulse is a linear chirp pulse.

3. The method as claimed in claim 1, wherein the initial chirp pulse is a linear hyperbolic chirp pulse.

4. The method as claimed in claim 1, further comprising the step of configuring the chirp pulse generator to transmit a signal transmission in the communication channel over the at least one first frequency band and experiences attenuation at a level greater than a further attenuation level in the communication channel over the other frequency bands.

5. The method of as claimed in claim 1 wherein the communication channel is an acoustic telemetry channel.

6. The method as claimed in claim 4, wherein the signal transmitted in the communication channel over the at least one first frequency band experiences a level of noise higher than the other frequency bands.

7. The method as claimed in claim 4, wherein the generated initial chirp pulse signal transmission over the at least one first frequency band experiences attenuation at a level greater than a further attenuation level in the communication channel over the other frequency bands.

8. The method as claimed in claim 7, further comprising:
   providing a receiving apparatus; and
   equalizing the initial chirp pulse via modulation of the amplitude by applying a correlator de-emphasis function, via the receiving apparatus, to the initial chirp pulse to compensate for difference in first and second values of TB product in the initial linear chirp pulse.

9. The method as claimed in claim 7, further comprising:
   compensating for the difference in first and second values of TB product in the initial chirp pulse by applying a correlator de-emphasis function.

* * * * *